United States Patent Office 3,829,308
Patented Aug. 13, 1974

3,829,308
ALKOXY TRIFLUOROMETHYLANILINE COMPOUNDS AND USE AS AN HERBICIDE
Philip L. Strong and Don L. Hunter, Anaheim, Calif. and Cecil W. LeFevre, Franklin, Idaho, assignors to United States Borax & Chemical Corporation, Los Angeles, Calif.
No Drawing. Original application Aug. 5, 1970, Ser. No. 61,449, now Patent No. 3,716,585. Divided and this application May 10, 1972, Ser. No. 252,076
Int. Cl. A01n 9/20
U.S. Cl. 71—121          10 Claims

ABSTRACT OF THE DISCLOSURE

N-alkyl substituted 5-alkoxy-2-nitro-4-trifluoromethylanilines and their thio analogues. The compounds are useful as herbicides and can be formulated with conventional herbicide carriers.

---

This application is a division of our co-pending application, Ser. No. 61,449, filed Aug. 5, 1970, now U.S. Pat. 3,716,585.

This invention relates to novel alkoxy-substituted trifluoromethylaniline compounds which are particularly useful as herbicides.

According to this invention there are provided novel compounds of the formula

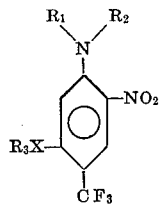

in which $R_1$ represents alkyl of from 2 to about 6 carbon atoms, $R_2$ represents hydrogen or alkyl of up to about 6 carbon atoms, $R_3$ represents lower alkyl of up to about 6 carbon atoms, and X is oxygen or sulfur. Typical alkyl groups represented by $R_2$ and $R_3$ are methyl, ethyl, n-propyl, isopropyl, n-butyl, sec-butyl, sec-amyl, 3-pentyl, and n-hexyl. $R_1$ can represent the same alkyl groups as $R_2$ and $R_3$ with the exception of methyl.

The 5-alkoxy-2-nitro-4-trifluoromethylanilines of this invention are readily prepared by reaction of the corresponding 5-halo-2-nitro-4-trifluoromethylaniline with an alkali metal alkoxide or thioalkoxide according to the following equation:

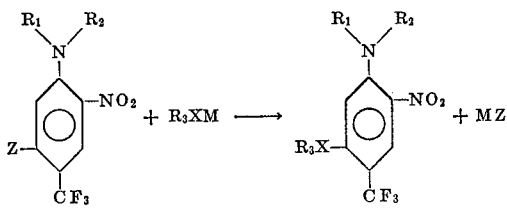

in which $R_1$, $R_2$, $R_3$ and X have the significance previously assigned, Z represents a reactive halogen atom such as bromine or chlorine, and M represents an alkali metal such as sodium or potassium.

The reaction takes place by combining approximately equimolar amounts of the reactants, preferably in the presence of solvent such as an alcohol, at a temperature of from about room temperature to the reflux temperature of the mixture, which is generally less than about 100° C. The insoluble by-product metal halide is readily separated from the reaction mixture such as by filtration and the desired product isolated and purified by conventional procedures such as distillation under reduce pressure. The desired compounds are either high-boiling liquids or crystalline solids which can be recrystallized from a suitable solvent.

The metal alkoxide is prepared by well-known procedures such as by addition of metallic sodium or potassium to the selected alcohol. The intermediate 5-halo-2-nitro-4-trifluoromethylaniline can be prepared by reaction of about equimolar amounts of the selected organic amine with 2,4-dihalo-5-nitro-benzotrifluoride. 2,4-dihalo-5-nitrobenzotrifluoride, in turn, is readily prepared by nitration of the corresponding 2,4-dihalobenzotrifluoride such as described by French Pat. 745,293 (see Chem. Abstracts 24, 4414).

The following examples illustrate preparation of representative compounds of the present invention.

EXAMPLE I

N-sec-butyl-5-ethoxy-2-nitro-4-trifluoromethylaniline

To a mixture of 2.98 g. (0.01 mole) of N-sec-butyl-5-chloro-2-nitro-4-trifluoromethylaniline in 20 ml. of absolute ethanol was added a solution of 0.23 g. (0.01 g. atom) of sodium in 10 ml. of absolute ethanol. The mixture was heated in a sealed tube at 120° C. overnight (15 hours) then cooled. The solvent was evaporated off under reduced pressure and the residue dissolved in ether. An insoluble solid (NaCl) was filtered off and the ether solution was evaporated to give 3.03 g. (99%) of product as an orange-brown oil. The assigned structure was supported by infrared and NMR analysis. The material solidified on standing, m.p. 44°–49° C.

EXAMPLE II

N,N-di-n-propyl-5-methoxy-2-nitro-4-trifluoromethylaniline was prepared by reaction of N,N-di-n-propyl-5-chloro-2-nitro-4-trifluoromethylaniline with sodium methoxide in methanol according to the procedure described above. The solvent was removed by distillation under reduced pressure to leave the desired product as an oily residue.

EXAMPLE III

N-ethyl-5-thioethoxy-2-nitro-4-trifluoromethylaniline was prepared by reaction of N-ethyl-5-chloro-2-nitro-4-trifluoromethylaniline with sodium thioethoxide in ethanol according to the procedure described above. The resultant product melts at 88°–89° C.

EXAMPLE IV

N-ethyl-5-ethoxy-2-nitro-4-trifluoromethylaniline was prepared by reacting N-ethyl-5-chloro-2-nitro-4-trifluoromethylaniline with sodium ethoxide in ethanol as described above. The resultant product melts at 121°–122° C. after recrystallization from ethanol.

Other compounds according to the present invention which can be prepared by the procedures described above include N,N-diethyl-5-n-propoxy-2-nitro-4-trifluoromethylaniline
N-methyl-N-ethyl-5-ethoxy-2-nitro-4-trifluoromethylaniline
N-sec-pentyl-5-thioethoxy-2-nitro-4-trifluoromethylaniline
N-n-hexyl-N-methyl-5-thiomethoxy-2-nitro-4-trifluoromethylaniline
N,N-di-ethyl-5-n-butoxy-2-nitro-4-trifluoromethylaniline.

The compounds of the present invention are useful as herbicides and are especially useful as selective herbicides for controlling weeds in desirable crops. They can be applied as either a pre-emergence or post-emergence treatment at a rate of from about ½ to 20 pounds per acre and preferably at a rate of about 1 to 5 pounds per acre.

The compounds are used to control the growth of weeds by applying a phytotoxic amount to the locus of the weeds such as the soil in which the weeds are growing or will grow or to the foliage of the growing plants. "Weeds," as used herein, is meant to include any plant growth which is undesirable.

The following example illustrates the herbicidal activity of representative compounds of this invention.

EXAMPLE V

Greenhouse flats were planted to soybeans, velvet leaf, oats, and millet, and on the same day as planting the flats were sprayed with an ethanol solution of the compound to be tested at a rate of 5 pounds per acre. The flats were kept in the greenhouse and watered when needed. Twenty-one days after treatment the plants were evaluated for herbicidal activity and rated on a 0 to 9 scale in which 0=no effect, 5=substantial injury with some kill, and 9=complete kill. The following results were obtained:

TABLE I

| Compound | Activity* | | | |
|---|---|---|---|---|
| | SB | VL | O | M |
| N,N-di-*n*-propyl-5-methoxy-2-nitro-4-trifluoro-methylaniline | 0 | 1 | 5 | 6 |
| N-*sec*-butyl-5-ethoxy-2-nitro-4-trifluoro-methylaniline | 0 | 3 | 8 | 9 |
| N-ethyl-5-ethoxy-2-nitro-4-trifluoromethylaniline | 0 | 0 | 5 | 6 |

* SB = Soy beans; O = Oats; VL = Velvet leaf; M = Millet.

Since a relatively small amount of one or more of the active alkoxy anilines should be uniformly distributed over the area to be treated, the compounds preferably are formulated with conventional herbicide carriers, either liquid or a solid. Thus, the compounds can be impregnated on or admixed with a finely divided solid carrier such as clay, vermiculite, calcium carbonate, and the like. Alternately, the compounds can be dissolved or suspended in a liquid carrier such as water, kerosene, alcohols, xylene, benzene, glycols, ketones, and the like. A surfactant preferably is included to aid in dispersion, emulsification and coverage. The surfactant can be either ionic or non-ionic and may be liquid or a solid. The use of the term surfactant herein is intended to include compounds commonly referred to as wetting agents, dispersing agents, and emulsification agents. Typical surfactants include the alkylaryl sulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated formulations containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active alkoxy anilines with a carrier or diluent, which may be a solid or liquid. Liquid carriers which are miscible with the active agent or other liquids in which the compound may be suspended or dispersed can be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also other herbicides, such as the sodium borates, sodium chlorate, chlorophenoxyacetic acids, substituted uracils and ureas, carbamates, amides, and haloalkanoic acids, can be included in the formulations.

Various changes and modifications of the invention can be made and, to the extent that such variations incorporate the spirit of this invention, they are intended to be included within the scope of the appended claims.

What is claimed is:

1. The method for controlling plant growth which comprises applying to the locus of said plants a phytotoxic amount of a compound of the formula

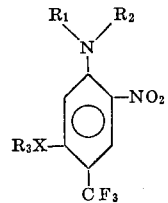

in which $R_1$ is alkyl of from 2 to about 6 carbon atoms, $R_2$ is selected from hydrogen and lower alkyl of up to about 6 carbon atoms, $R_3$ is lower alkyl of up to about 6 carbon atoms, and X is selected from oxygen and sulfur.

2. The method according to claim 1 in which said compound is applied at a rate of from about 1 to 5 pounds per acre.

3. The method according to claim 1 in which said compound is N-*sec*-butyl-5-ethoxy-2-nitro-4-trifluoromethylaniline.

4. A herbicidal composition comprising a phytotoxic amount of a compound of the formula

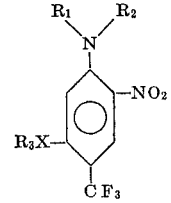

5. A herbicidal composition according to claim 4 in which a surfactant is included.

6. The method according to claim 1 in which said compound is N,N-di-*n*-propyl-5-methoxy-2-nitro-4-trifluoromethylaniline.

7. The method according to claim 1 in which X is an oxygen atom.

8. The method according to claim 1 in which $R_1$ is *sec*-butyl and $R_2$ is hydrogen.

9. The method according to claim 1 in which said compound is applied as a pre-emergence treatment to soil.

10. A herbicidal composition according to claim 5 in which said compound is N-*sec*-butyl-5-ethoxy-2-nitro-4-trifluoromethylaniline.

References Cited

UNITED STATES PATENTS

| 3,257,190 | 6/1966 | Soper | 71—121 |
| 3,617,250 | 11/1971 | Woods | 71—121 |
| 3,726,923 | 4/1973 | Foster et al. | 71—121 |

JAMES O. THOMAS, JR., Primary Examiner

U.S. Cl. X.R.

71—80, 92, 98, 111, 113, 118, 120

UNITED STATES PATENT OFFICE
CERTIFICATE OF CORRECTION

Patent No. 3,829,308　　　　　　　　Dated August 13, 1974

Inventor(s) P.L. Strong, D.L. Hunter, and C.W. LeFevre

It is certified that error appears in the above-identified patent and that said Letters Patent are hereby corrected as shown below:

In Column 4, line 45, please add the following--wherein $R_1$ is alkyl of from 2 to about 6 carbon atoms, $R_2$ is selected from hydrogen and lower alkyl of up to about 6 carbon atoms, $R_3$ is lower alkyl of up to about 6 carbon atoms, and X is selected from oxygen and sulfur, and a a carrier therefor. --

Signed and sealed this 1st day of April 1975.

(SEAL)
Attest:

RUTH C. MASON
Attesting Officer

C. MARSHALL DANN
Commissioner of Patents
and Trademarks